United States Patent [19]
Stahlhuth

[11] 3,747,434
[45] July 24, 1973

[54] HARMONIC DRIVE
[75] Inventor: Paul H. Stahlhuth, Mission Viejo, Calif.
[73] Assignee: Philco-Ford Corporation, Philadelphia, Pa.
[22] Filed: Sept. 10, 1971
[21] Appl. No.: 179,446

[52] U.S. Cl. .................................. 74/640, 74/804
[51] Int. Cl. ........................ F16h 35/00, F16h 1/28
[58] Field of Search ................... 74/640, 796, 797, 74/800, 804, 793; 310/82

[56] References Cited
UNITED STATES PATENTS
| | | | |
|---|---|---|---|
| 2,908,191 | 10/1959 | Sundt | 74/804 |
| 3,159,056 | 12/1964 | Blazo | 74/793 |
| 3,161,082 | 12/1964 | Musser | 74/640 |
| 3,304,809 | 2/1967 | Hellen | 74/640 X |
| 3,381,549 | 5/1968 | Hirakawa | 74/804 |

Primary Examiner—Arthur T. McKeon
Attorney—Robert D. Sanborn

[57] ABSTRACT

A harmonic drive including a strain wave generator for urging the teeth of a flexible spline into rolling, progressive engagement with the teeth of a circular spline. A pair of circular disks are so rotatably mounted as to cause a predetermined portion of one disk to urge a portion of the teeth of the flexible spline into engagement with the teeth of the circular spline, while a diametrically opposed portion of the other disk urges another portion of the teeth of the flexible spline into engagement with the teeth of the circular spline. The portions of the disk which produce tooth engagement lie in a common plane extending substantially normal with respect to the axis of the splines and substantially centered with respect to the length of the teeth of the flexible spline.

6 Claims, 2 Drawing Figures

INVENTOR
PAUL H. STAHLHUTH
BY
Carl H. Lynnestredt
AGENT

3,747,434

HARMONIC DRIVE

BACKGROUND OF THE INVENTION

This invention is concerned with rotary-to-rotary harmonic drive transmissions, and particularly to wave generators for use therein. Transmissions of this kind have wide applicability, particularly where a very substantial gear reduction is desired. For example they have been used in such diverse fields as the powering of tools, machinery, appliances and the stabilization of space vehicles.

It has been known to utilize a pair of parallel disks or wheels eccentrically mounted upon an input or driving shaft, and each of which wheels has a portion urging the teeth of the flexible spline into engagement with the teeth of the circular spline. In such a double eccentric wave generator the offset disks lie in parallel planes which are perpendicular to the input shaft and which intersect the flexible spline at locations spaced from one another along the shaft axis. This offset geometry results in dynamic imbalance, and produces a couple resulting in asymmetrical loading of the flexible spline and consequent vibration. The forces and vibrations can interfere with proper operation of the harmonic drive and will shorten the life thereof.

SUMMARY OF THE INVENTION

I have recognized that such difficulties and disadvantages are susceptible of very simple solution. In this connection I have found that imbalance, and resultant deleterious vibrations, can be minimized by mounting the rotating disks upon shaft bearing pad areas, or other suitable bearing means, so skewed that the disk portions which urge the teeth of the flexible spline into engagement with the teeth of the circular spline lie in a common plane extending substantially normal with respect to the axis of the input shaft, and preferably substantially centered with respect to the length of the teeth of the flexible spline.

The apparatus of my invention is further featured by the the fact that the skewed bearing means upon which the disks are mounted preferably takes the form of a sleeve encircling the input shaft, with slight clearance with respect to said shaft, and being pinned to the shaft in such manner as to provide freedom for limited deflection of the sleeve with respect to the shaft in the direction of the major axis of the wheel assembly. This arrangement compensates for any misalignment between the input shaft and the teeth of the flexible spline.

In summary, harmonic drive apparatus incorporating the principles of this invention has the following advantages:

a. it simplifies fabrication and reduces cost;
b. it minimizes dynamic imbalance and asymmetrical loading of the flexible spline; and
c. it allows the disk driving means to tilt or deflect very slightly relative to the input shaft, whereby to accommodate tolerance build-up between the input shaft and the splines.

DETAILED DESCRIPTION OF THE INVENTION

Strain wave generators for harmonic drive units are now well known in the art, and the principles thereof require description herein only to the extent necessary to point out the nature and significance of the modifications which I have devised. It should, however, be noted that such drives utilize a circular spline which serves as a reaction member and is provided with a plurality of internal teeth. A rotatable flexible spline, provided with mating external teeth, is cooperable with the circular spline, its teeth being urged into rotating progressive engagement with the teeth of the circular spline by means adapted to induce a strain wave in the flexible spline. Apparatus of this kind can be operated at high speeds, can be fabricated of a variety of materials, including both metal and so-called "plastic," such for example as poly-tetrafluoroethylene (Teflon), and can achieve very substantial gear reductions. Where, as in the apparatus of the present invention, two lobes are used on the wave generator the difference in the number of teeth between the circular spline and the flexible spline (which has the lesser number of teeth) will be two, or a multiple thereof. If, by way of example, the circular spline is provided with 50 teeth, and the flexible spline with 48 teeth, the difference in the number of teeth will result in the flexible spline, and hence the output shaft, advancing two teeth for each revolution of the input shaft. This is 2/50 or a 25 to 1 reduction.

As indicated earlier in this specification I have devised an improved wave generator for use in such rotary-to-rotary harmonic drive transmissions and employ skewed means for driving the disks, rather than the known double eccentric.

Figure 1:
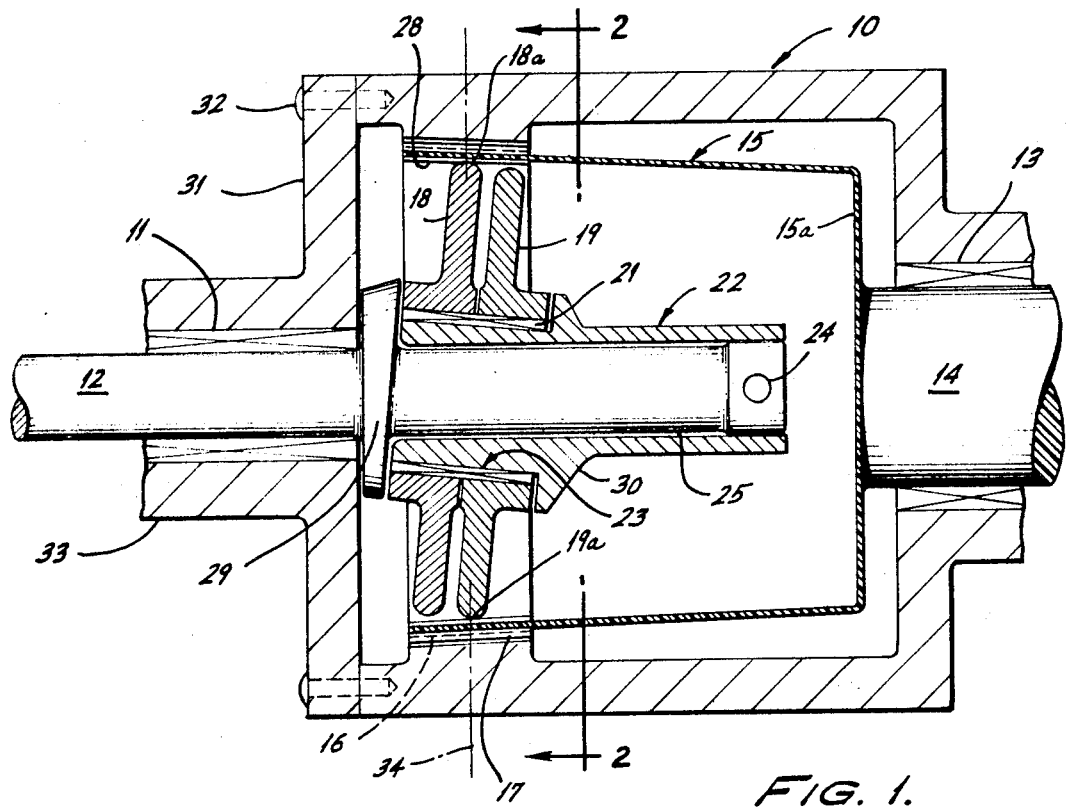
FIG. 1 is a longitudinal, sectional view of a harmonic drive incorporating the stress wave generator of the invention.

As seen in FIG. 1 the apparatus of the invention comprises a circular spline 10, which conveniently forms part of a closed cylindrical housing for the transmission and which may, and preferably does, have suitable bearing means, such as the means diagrammatically shown at 11, mounting the input shaft 12. Similar bearing means 13 mounts an output shaft 14 driven by the input shaft at a speed which is a function of the reduction ratio. A flexible spline 15, which is of generally cylindrical configuration, is disposed within the housing defined by circular spline 10 and has its closed end 15a associated in any convenient manner with the output shaft 14. The shafts and splines may be made of metal or, if desired, some or all of them may be made of plastic material, for example Teflon, depending upon the requirements of the particular apparatus under design. If the flexible spline is of plastic material, as shown, its rear wall 15a may be formed integrally with the output shaft, as shown, or it may be pinned or bolted to the shaft. Both splines are completely encircled by teeth. The teeth 16 of the circular spline are disposed to cooperate with the teeth 17 of the flexible spline, and it should be understood that, as best appears in FIG. 2, engagement between the teeth 16 and 17 occurs only in two diametrically opposed regions of the transmission assembly. In the position shown in FIG. 2, these regions appear at the upper and lower parts of the figure.

In particular accordance with the invention, progressive engagement of the teeth is brought about through the agency of apparatus which generates a strain wave in the flexible spline. This apparatus comprises a pair of disks 18 and 19 which are rotatably mounted on skewed bearing means associated with the input shaft 12 and constrained to rotate with said shaft. If desired, a pad or race may be interposed between the skewed bearing means and the central apertures of the rotatable disks. Such a pad is shown at 21.

Preferably the bearing means takes the form of a hollow drive sleeve or shaft 22 having a suitably configured skewed extension 23 (FIG. 1), toward one end thereof. The sleeve is pinned, as at 24, to the input shaft. As shown at 25, a predetermined, small clearance is provided between the inside surface of the sleeve 22 and the exterior surface of the input shaft 12.

The pin 24 extends in the direction of the minor axis of the assembly of wheels, and therefore accommodates limited deflection or titling, of the sleeve with respect to the input shaft in the direction of the major axis of the assembly of wheels. This action compensates for any misalignment between the input shaft and the spline means.

Figure 2:
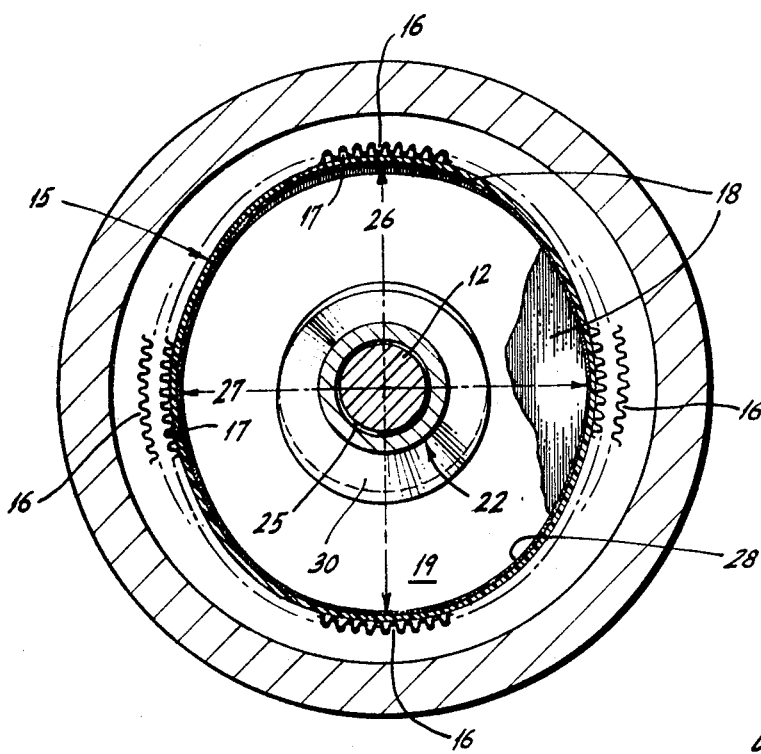
FIG. 2 is a cross-sectional view of a harmonic drive of the kind illustrated in FIG. 1, the view being taken looking in the direction of the line 2—2 applied to FIG. 1.

The major and minor axes of the assembly of wheels 18 and 19 appear, respectively, at 26 and 27 in FIG. 2. Since the "throw," or projection, of the skewed bearing means 23 extends in the vertical direction — in the position of the apparatus as represented in FIG. 2 — this direction is designated as the major axis 26. The length of this dimension is determined by the span across the projection of the two skewed disks 18 and 19. The minor axis 27 represents the width of one disk, since both disks have equal radial projection in the direction of the axis. Therefore, in the horizontal direction shown in FIG. 2, the peripheral edges of the two disks coincide and make contact with a bearing pad 28 which extends peripherally around the inside surface of the flexible spline 15, in a region backing the teeth of said spline.

As will be understood, the disks are circular. However the dimension along the minor axis, as it appears in FIG. 2, is a little shorter than it would actually be. It has been so shown in order to facilitate illustration of the cooperable teeth 16 and 17 and to show said teeth in the disengaged position. In actual practice, the throw of the skewed bearing would be just enough to cause engagement of the teeth as illustrated along the major axis 26, with freedom for the teeth of the flexible spline to move radially inwardly a distance just sufficient to insure disengagement from the teeth 16 of the circular spline.

The shaft 12 is provided with an abutment 29, and the hollow sleeve 22 carries a similar abutment 30. As will be apparent from FIG. 1, the disks are retained in assembly on the skewed bearing means through the agency of the confronting faces of the abutments 29 and 30. A portion of the housing formed by the circular spline is separable, to accommodate assembly of the apparatus. This separation can be afforded in any convenient manner and, as illustrated, takes the form of a cap 31 fastened to the spline by suitable screw threaded elements 32, said cap carrying a sleeve portion 33 within which is retained the above-mentioned bearing 11 for input shaft 12.

In operation, rotation of the input shaft 12 imparts rotary movement to its skewed bearing means 23 and a corresponding rolling progression of the diametrically opposed disk points or regions 18a and 19a (FIG. 1) around the inside pad surface of the flexible spline. It is through these projecting regions or points of contact with the flexible spline 15, that the teeth 17 of said spline are brought into progressive engagement with the teeth 16 of the circular spline. In particular accordance with this invention, and as will now be understood, the skewing of the bearing means is such as to cause the region 18a of disk-to-flexible-spline contact, and the diametrically opposed region 19a, to constitute the sole regions in which the teeth are brought into interengagement. In all other regions, the teeth are out of engagement, as appears to best advantage in FIG. 2 looking in the direction of minor axis 27.

It should be understood that the regions of contact 18a and 19a roll around the interior of the flexible spline 15, in contact with the pad 28 thereof, at the rotational speed of the input shaft 12. In designing any particular embodiment the difference in disk projection should be sufficient fully to engage and fully to disengage the teeth of the two splines. Also the degree of skewing of the disk-supporting bearing means should be so chosen that the regions of contact 18a and 19a always rotate in and remain essentially in the same plane perpendicular to the axis of the input shaft. This plane is represented in the drawing at 34 and is generally centered with respect to the axial length of the interengaging teeth. By virtue of this coplanar disposition of the contact regions 18a and 19a, asymmetrical loading and dynamic imbalance of the mechanism are reduced.

I claim:

1. In a harmonic drive of the type having toothed circular spline means and toothed flexible spline means, said spline means being substantially concentrically mounted and relatively movable to accommodate bringing the teeth of said flexible spline means into engagement with the teeth of said circular spline means at a plurality of spaced points, means for generating a strain wave in said flexible spline means yieldingly and progressively to urge its teeth into the stated engagement, said means comprising: a rotatable input shaft carrying bearing means skewed with respect to the axis of the shaft; and a pair of disk elements rotatably mounted on the skewed bearing means and each element having at least a portion of its periphery in resilient contact with said flexible spline means and urging the teeth of the latter into the stated progressive engagement with the teeth of the circular spline means as the shaft rotates, said disk elements being generally parallel and said tooth-urging portions of each thereof being angularly spaced with respect to one another, the dimensions of said disk-like elements and the skewing of said bearing means being such that said angularly spaced contact portions lie generally in a common plane extending substantially normal to the axis of said shaft.

2. A harmonic drive in accordance with claim 1, and further characterized in that said means for generating a strain wave brings the teeth of said flexible spline means into engagement with the teeth of said circular spline means at two spaced points each defined by the stated portion of a corresponding one of said disk elements, the angular spacing of one contacting portion, with respect to the other thereof, being approximately 180°.

3. A harmonic drive in accordance with claim 1, and further characterized in that the bearing means of said input shaft comprises a drive sleeve through which passes said shaft, said sleeve being fixed as against rotation with respect to said shaft and having a portion which is skewed with respect to the axis of the shaft, said disk elements being rotatably mounted upon said skewed portion and, together with said portion, defining major and minor axes extending transverse the shaft axis and at right angles to one another.

4. A drive in accordance with claim 3, and in which a predetermined degree of clearance is provided between said drive sleeve and input shaft, and an end portion of said sleeve is pinned to said shaft to afford freedom for limited tilting of said sleeve with respect to said shaft in the direction of said major axis, whereby to compensate for any misalignment between said input shaft and the teeth of said flexible spline means.

5. In a harmonic drive including a toothed circular spline and a toothed flexible spline, said splines being adapted to mesh at circumferentially spaced regions, a strain wave generator for urging the teeth of the flexible spline into rolling progressive engagement with the teeth of the circular spline, said generator comprising: input shaft means extending coaxially with respect to said splines and having skewed bearing means thereon, a pair of circular disks so rotatably mounted on said skewed bearing means as to cause a predetermined portion of one disk to urge the teeth of said flexible spline into engagement with the teeth of said circular spline and a diametrically opposed portion of said other disk to urge the teeth of said flexible spline into engagement with the teeth of said circular spline, said portions of said disks lying in a common plane extending substantially normal to the axis of said shaft means.

6. A drive in accordance with claim 5, and in which the plane containing said portions is substantially centered with respect to the length of the teeth of said flexible spline.

* * * * *